E. FITZHENRY.
Hide and Leather Working Machines.

No. 156,991. Patented Nov. 17, 1874.

5 Sheets--Sheet 1.

WITNESSES.
J. P. Th. Lang.
C. L. Evert.

INVENTOR
Edward Fitzhenry.
Alexander Mason
By
Attorneys.

5 Sheets--Sheet 2.
E. FITZHENRY.
Hide and Leather Working Machines.
No. 156,991. Patented Nov. 17, 1874.
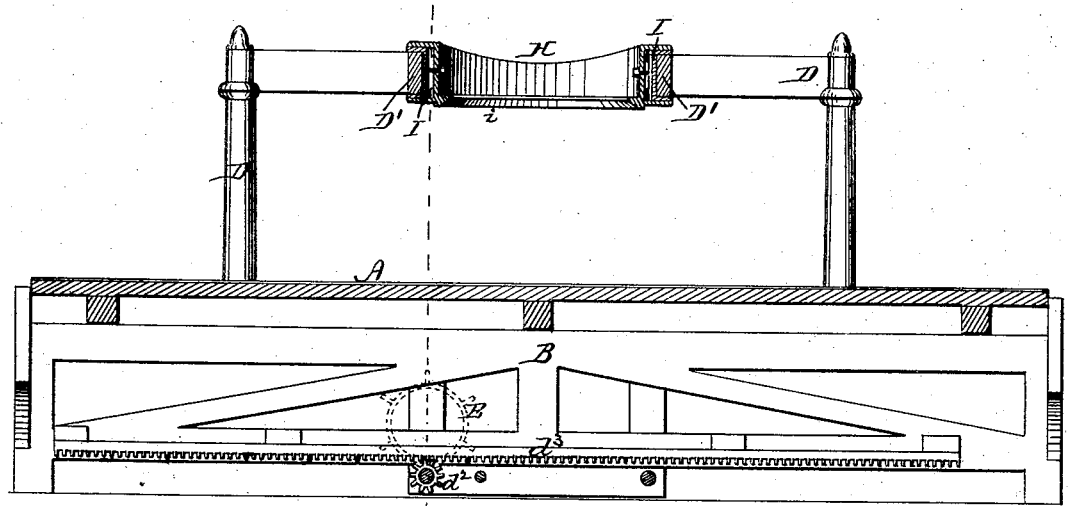
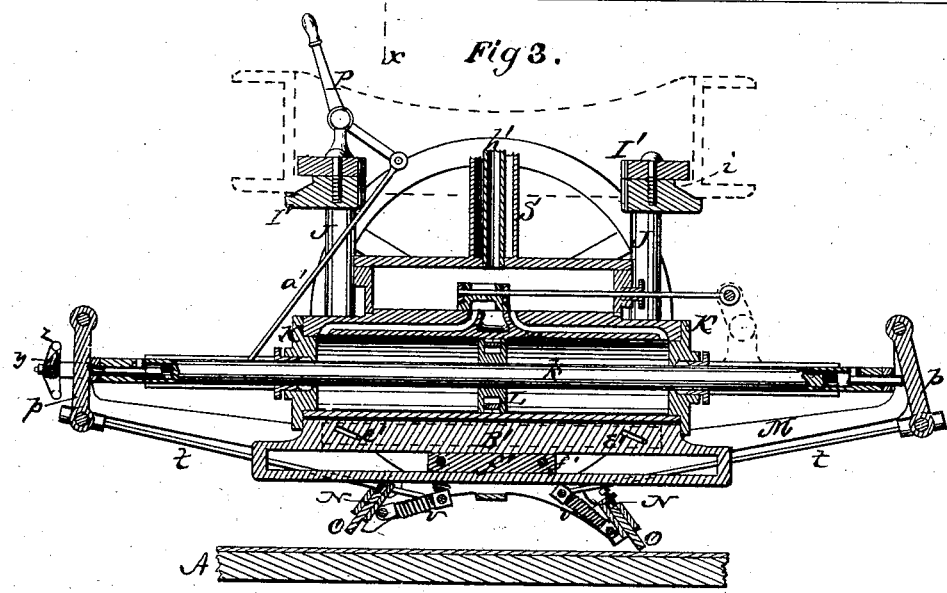
WITNESSES.
J. P. Th. Lang
C. L. Evert.
INVENTOR
Edward Fitzhenry,
Alexander Mason
By.
Attorneys.

5 Sheets--Sheet 3.

E. FITZHENRY.
Hide and Leather Working Machines.

No. 156,991. Patented Nov. 17, 1874.

WITNESSES
J. P. Th. Lang
C. L. Everh

INVENTOR
Edw. Fitzhenry
By Alexander ?????
Attorney

5 Sheets--Sheet 4.

E. FITZHENRY.
Hide and Leather Working Machines.

No. 156,991. Patented Nov. 17, 1874.

WITNESSES
J. P. Ch. Lang.
C. L. Everit.

INVENTOR
Edward Fitzhenry
per
Alexander Mather
Attorneys

5 Sheets--Sheet 5.

E. FITZHENRY.
Hide and Leather Working Machines.

No. 156,991. Patented Nov. 17, 1874.

WITNESSES
J. P. Theodore Lang.
C. L. Evert.

INVENTOR
Edward Fitzhenry,
per
Alexander Mason
Attorneys

UNITED STATES PATENT OFFICE.

EDWARD FITZHENRY, OF SOMERVILLE, MASSACHUSETTS.

IMPROVEMENT IN HIDE-AND-LEATHER WORKING MACHINES.

Specification forming part of Letters Patent No. 156,991, dated November 17, 1874; application filed July 11, 1874.

*To all whom it may concern:*

Be it known that I, EDWARD FITZHENRY, of Somerville, in the county of Middlesex and in the State of Massachusetts, have invented certain new and useful Improvements in Hide-and-Leather Working Machine; and do hereby declare that the following is a full, clear, and exact description thereof, reference being had to the accompanying drawings and to the letters of reference marked thereon, making a part of this specification.

The nature of my invention consists in the construction and arrangement of a machine for working hides and leather, as will be hereinafter more fully set forth.

In order to enable others skilled in the art to which my invention appertains to make and use the same, I will now proceed to describe its construction and operation, referring to the annexed drawings, in which—

Figure 1:
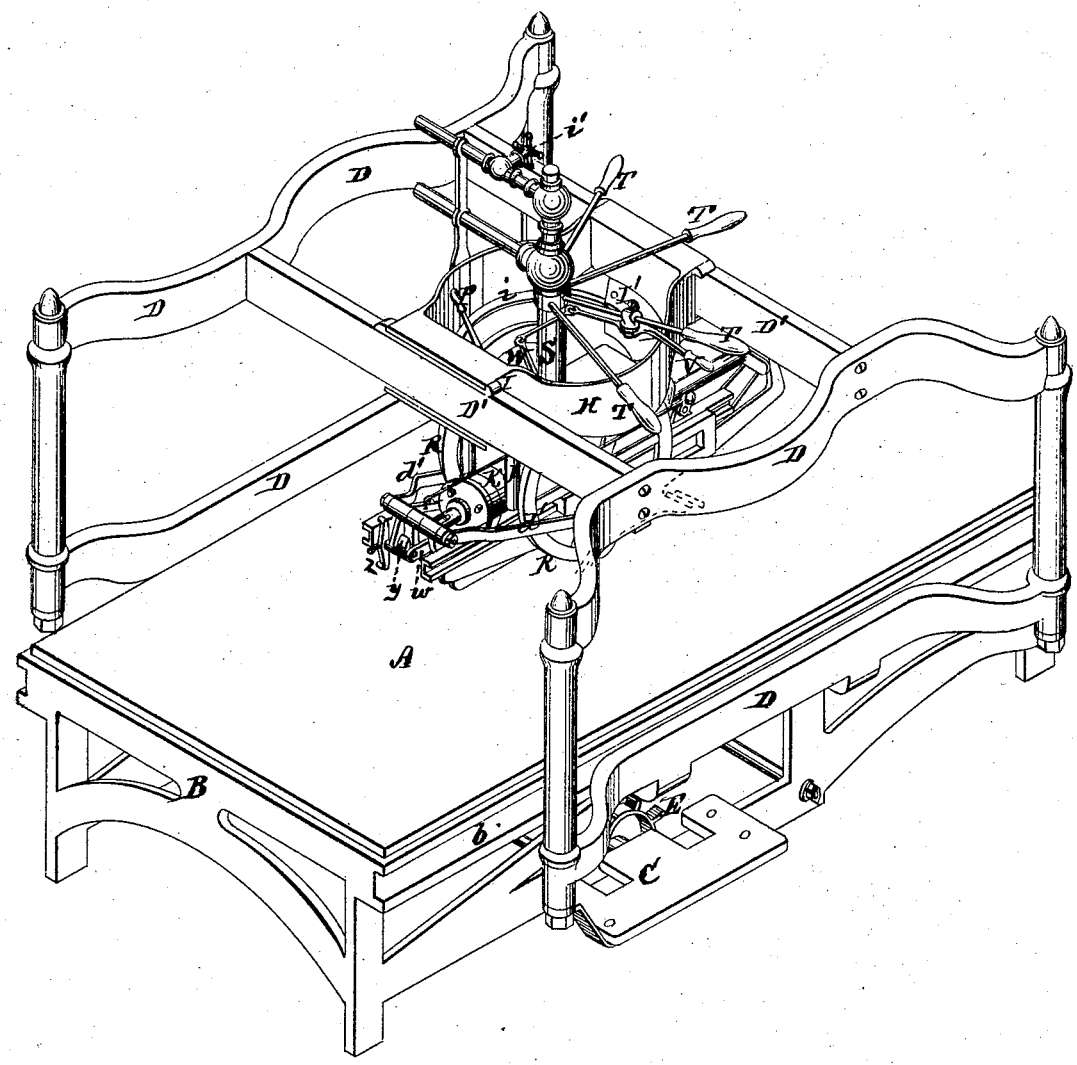
Figure 4:
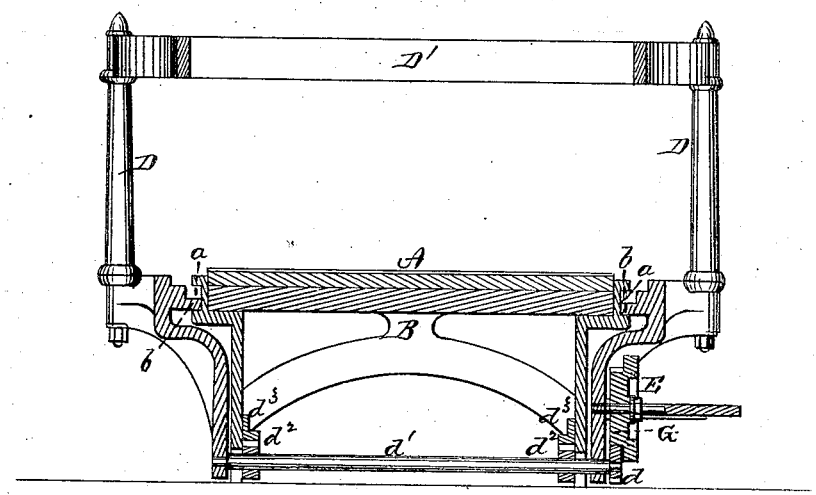
Figure 5:
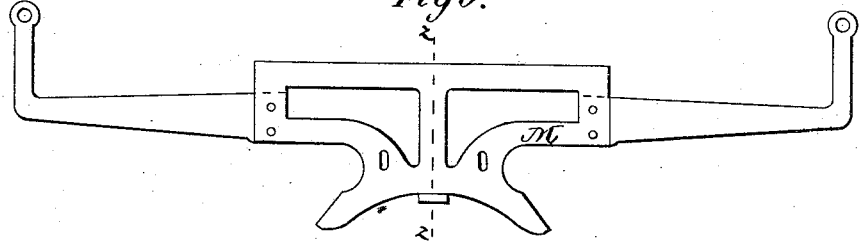
Figure 6:
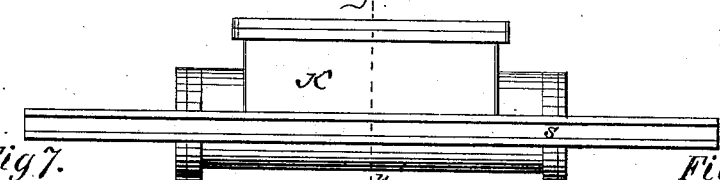
Figure 7:
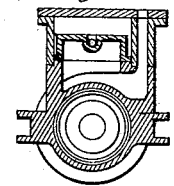
Figure 8:
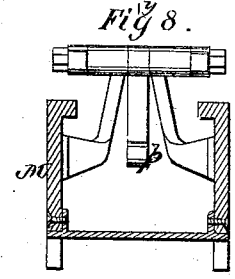
Figure 9:
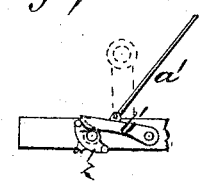
Figure 10:
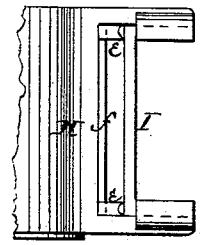
Figure 11:
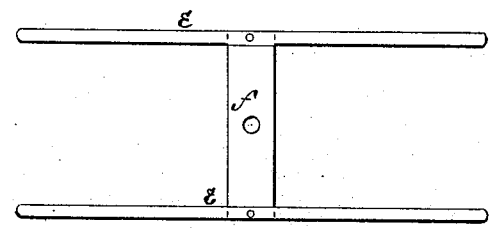
Figure 12:
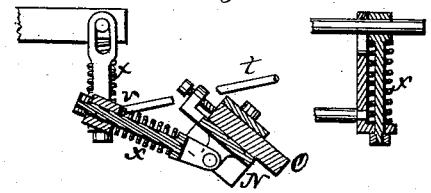
Figure 13:
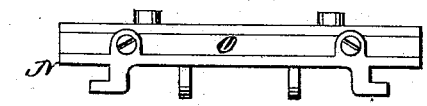
Figure 14:
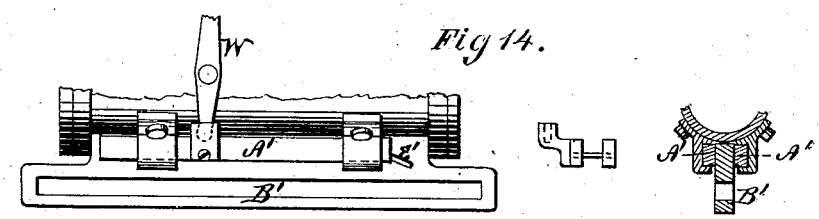
Figure 15:
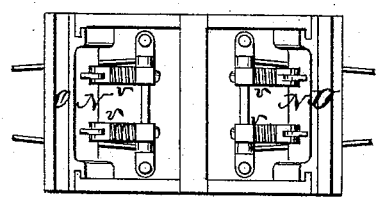
Figure 16:
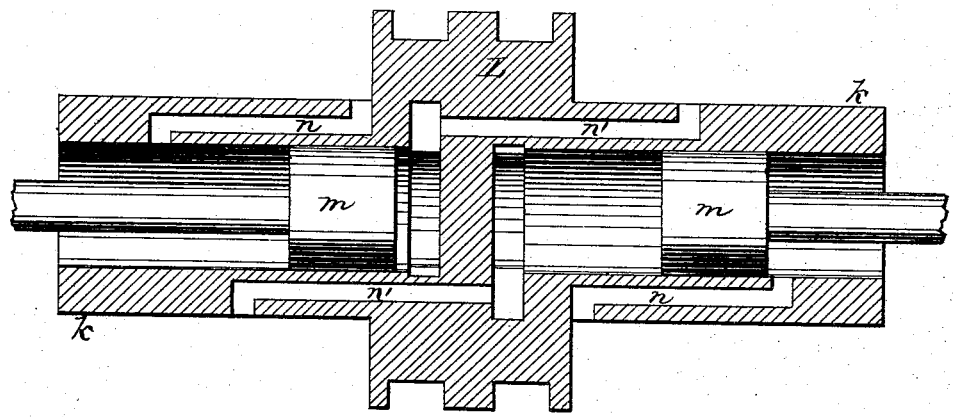
Figure 17:
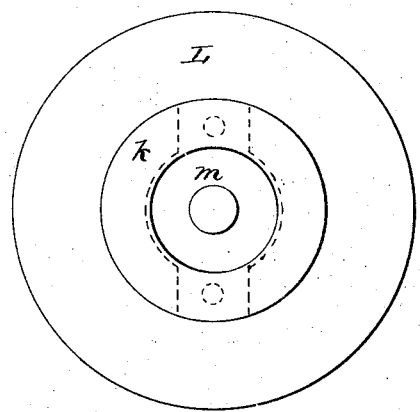

Figure 1 is a perspective view of my entire machine. Fig. 2 is a longitudinal vertical section of the table and sliding frame thereon. Fig. 3 is a longitudinal vertical section of the entire mechanism suspended from the sliding frame. Fig. 4 is a transverse vertical section of the table and frame through the line $x\ x$, Fig. 2. Fig. 5 is a side view of the movable frame for attaching the tools. Fig. 6 is a side view of the steam-cylinder with guides. Fig. 7 is a transverse section of the steam-cylinder through the line $y\ y$, Fig. 6. Fig. 8 is a transverse section of the tool-frame through the line $z\ z$, Fig. 5. Fig. 9 represents a mechanism for preventing the tools from being lowered. Fig. 10 is a side view of one end of the sliding frame, in which the entire mechanism is suspended. Fig. 11 represents springs in said frame. Fig. 12 represents the tools with their toggle-joints. Fig. 13 is a bottom view of the tool-holder. Fig. 14 is a side view of the mechanism for raising and lowering the tools. Fig. 15 is a bottom view of the tool-frame. Fig. 16 is an enlarged longitudinal section of the cylinder-piston with the interior pistons. Fig. 17 is an end view of the same.

A represents the table upon which the leather is worked. This table rests upon the frame B, and is of sufficient size to allow of two ordinary sides of leather being placed upon it at the same time. C represents a platform, upon which the operator stands while working the machine. This platform is attached to a frame-work, D, which is built substantially in the manner shown in Fig. 1, it being simple in construction, and at the same time strong and light. It is supported by means of slides $a\ a$, in grooves $b\ b$ on the table-frame B, and moves back and forth in the same.

In the frame-work D, at the inner edge of the operator's platform C, is a treadle-wheel, E, on the back of which is a cog-wheel, G. This cog-wheel gears with a pinion, $d$, upon the end of a shaft, $d^1$, in the lower part of the frame D, said shaft being provided with two other pinions, $d^2\ d^2$, which gear with rack-bars $d^3\ d^3$, secured to the inner sides of the table-frame B. The operator, standing upon the platform C, by working the treadle-wheel E, can thus move the entire frame-work D, and everything connected therewith, from one end of the table to the other, as the work may require.

In the upper part of the frame D are two parallel bars, D' D', upon which slides a circular frame, H. This frame forms flanged boxes on opposite sides, in each of which is placed a flanged gib, I.

While the machine is running crosswise of the table, if it were turned suddenly to run parallel with the table, and the inertia were not overcome, it would naturally weaken the frame D D', as well as the machine lose its regularity of movement.

To avoid this I leave a space between each gib and the frame H, and in said space are inserted two springs, $e\ e$, connected by a cross-bar, $f$, and said cross-bar attached to the frame. By this means, when there is any necessity for it, the frame H will give sufficiently to overcome the inertia of the machine, and prevent the straining of the parts.

On the inside, around the lower edge of the frame H, is an inward-projecting flange, $i$, which is beveled on its under side. On this flange are placed two grooved head-blocks, I' I', attached to the upper ends of standards J J at the ends of the steam-cylinder K. L is the piston inside of the cylinder K, and $k$ the piston-rod thereof, extending in both directions through the heads of the cylinder. The piston-rod $k$ is hollow or tubular, and on each side of the piston, in said hollow rod, is a smaller piston and rod, $m$. $n$ and $n'$ are steam-passages to each small piston $m$. When the piston L is at one end of the cylinder previous to its making a stroke, the opening to the passage $n$ on that side of the piston is within the stuffing-box, and cannot, therefore, take steam; but as soon as the piston L has begun its stroke said opening is withdrawn from the stuffing-box, and immediately receives the steam, which passes through it into the hollow piston-rod $k$ back of the piston $m$ on the other side of the large or main piston, and, consequently, forces it outward in the same direction the main piston is moving. This movement of the piston $m$ throws outward a swinging lever, $p$, hung in the end of a sliding frame, M, which moves back and forth in grooved ways $s$ on the sides of the cylinder K. The lower ends of the lever $p$ is by rods $t\ t$ connected with the toggle-joints $v\ v$ supporting the tool-holders N N, so that at each stroke of the main piston one of said tool-holders will be lowered to cause the tools to bear on the leather. When the steam enters the cylinder to form a lead or cushion for the main piston previous to its return-stroke, the steam immediately enters the passage $n'$, driving the piston $m$ back to the original position, and thereby raising the tools from the table, where they remain till at the beginning of another stroke the steam again enters the passage $n$ and forces the small piston $m$ outward. When one of the pistons $m$ raises one tool-holder and set of tools from the table the other piston forces the other holder and set of tools almost at the same time down on the table. The rods of the pistons $m\ m$ are connected to the levers $p\ p$ by stirrups $w$, and the movement of the main piston and piston-rod gives a reciprocating motion to the sliding frame M. O O represent the tools, which are firmly attached to the tool-stocks or tool-holders N N by a bolt or bolts passing through holes pierced in the tools, stocks, and covering-plates alike, and the stocks or holders slide upon the frame M. The pressure of the tools upon the leather is obtained by means of springs $x\ x$, above and below the joints in the toggles $v\ v$, as shown in Fig. 12. In the outer end of each stirrup $w$ is a cam, $y$, upon a shaft passing through the stirrup, and on one end of this shaft is a lever, $z$. On one of the head-blocks I is pivoted an elbow-lever, P, connected by a rod, $a'$, with an arm or pawl, $b'$, pivoted on the inner side of one of the ways $s$. By the use of the lever P the arm $b'$ may be set so that either end of the lever Z will strike the end thereof and set the cam $y$. By allowing one end to strike the arm the cam will be turned away from the swinging lever $p$, and hence allow the piston $m$ to raise and lower the tools. When the other end of the lever is made to strike the arm $b'$ the cam will be turned against the swinging lever $p$, holding the same rigid, so that the piston $m$ cannot lower the tools, but they will remain raised. Two balance-wheels, R R, are used, one on each side of the cylinder, which admits of two connecting-rods, $d^1$ $d^1$, to the carriage or frame M, thereby giving a stronger and firmer control of the same. S represents the exhaust-pipe, to which are attached handles T T, for giving the engine the pivot-motion, as well as the movement crosswise of the table. To one of these handles is pivoted a lever, V, which is connected with another lever, W, pivoted to the side of the cylinder K, and the lower end of this last lever pivoted to sliding bars A'.

These sliding bars have pins passing through them, which bars also pass through inclined slots $e'$ in a bar, B', placed between them, so that by the movement of the levers V W said bar B' will be raised or lowered, as desired. The bar B' is slotted longitudinally, and in this slot is placed a sliding block, $f'$, through the ends of which pass the upper rods of the toggle-joints $v\ v$. By these devices the tools may be raised from the table while the machine is in motion, so that it may be moved from one side of the leather to the other without touching it. This may also be used for regulating the pressure on the tools. Inside of the exhaust-pipe S is the steam-inlet pipe $h'$, and the amount of steam used is regulated by a throttle-valve, $i'$.

The object of arranging one steam-pipe within the other is to admit of the steam-cylinder and operating mechanism being revolved or turned in either direction without interfering with the pipe conveying steam to and from the same.

This machine is not attached to, supported by, or fastened to any part of the building in which it is set up, as it is a machine in itself. The frame is strong and light. The table is long enough to admit of two ordinary sides of leather being placed on it at the same time, so that one side, when finished, may be replaced with a fresh one while the machine is at work on the other, whereby it is constantly operating on leather. The tools can be brought to bear upon any points of the table by the peculiar construction of the frames and the pivot motion. By raising and lowering the tools by toggle-joints, as described, I obtain a nearly-perpendicular motion of the tools, so that there is no sudden contact of the tools with the leather, and thereby prevent the marking of the leather by the tipping or circular motion.

Having thus fully described my invention, what I claim as new, and desire to secure by Letters Patent, is—

1. The combination, with the table A and frame B, of the sliding frame-work D D' supporting the entire operating mechanism, the platform C, treadle-wheel E with cog-wheel G, shaft $d^1$ with pinions $d\ d^2$, and rack-bars $d^3$, all substantially as and for the purposes herein set forth.

2. The combination, with the sliding framework D D', of the circular sliding frame H, flanged gibs I, and springs $e$, substantially as and for the purposes herein set forth.

3. The combination of the circular sliding frame H, provided with interior flange $i$, the grooved head-blocks I' I', and standards J J, from which is suspended the entire operating mechanism, whereby said mechanism may be given a rotary motion, as described.

4. In combination with the cylinder K and piston L, the hollow piston-rod $k$ with steam-passages $n$ $n'$, and interior pistons and rods $m$, substantially as and for the purposes herein set forth.

5. The combination of the pistons $m$, swinging lever $p$, rods $t$, toggle-joints $v$, and tool-stocks N, substantially as and for the purposes herein set forth.

6. The combination of the pistons $m$, stirrups $w$, lever $p$, cam $y$, lever $z$, pivoted arm $b'$, connecting-rod $a'$, and lever P, substantially as and for the purposes herein set forth.

7. The combination of the steam-cylinder K with the pistons L $m$ $m$, sliding frame or carriage M, carrying the tools, swinging levers $p$, rods $t$, and toggle-joints $v$, substantially as and for the purposes herein set forth.

8. The combination of the levers V W, sliding bars A', slotted bar B', and block $f'$, substantially as and for the purposes herein set forth.

9. The exhaust-pipe S, with the steam-inlet pipe $h'$ arranged within the same, for the purposes set forth.

In testimony that I claim the foregoing I have hereunto set my hand this 5th day of June, 1874.

EDWARD FITZHENRY.

Witnesses:
 JAS. B. BELL,
 ALLAH W. WRIGHT.